(12) United States Patent (10) Patent No.: US 9,147,437 B2
Yoshida (45) Date of Patent: Sep. 29, 2015

(54) LIBRARY APPARATUS, MAGAZINE INSERTION DETECTION METHOD, AND PROGRAM

(75) Inventor: Toru Yoshida, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/001,256

(22) PCT Filed: Jan. 20, 2012

(86) PCT No.: PCT/JP2012/051163
§ 371 (c)(1),
(2), (4) Date: Aug. 23, 2013

(87) PCT Pub. No.: WO2012/132503
PCT Pub. Date: Oct. 4, 2012

(65) Prior Publication Data
US 2013/0329540 A1 Dec. 12, 2013

(30) Foreign Application Priority Data
Mar. 30, 2011 (JP) .................................. 2011-074609

(51) Int. Cl.
*G11B 33/12* (2006.01)
*G11B 33/04* (2006.01)
*G11B 15/68* (2006.01)

(52) U.S. Cl.
CPC ............ *G11B 33/04* (2013.01); *G11B 15/6835* (2013.01); *G11B 33/123* (2013.01)
USPC .......................................... 360/99.18; 369/99

(58) Field of Classification Search
CPC ........ G11B 17/00; G11B 17/02; G11B 17/04; G11B 5/012; G11B 33/02; G11B 33/04; G11B 33/06; G11B 5/33; G11B 5/127; G11B 33/12; G11B 33/123
USPC ........ 360/99.18, 99.12, 99.16, 99.08; 369/99, 369/100, 30.08; 720/605, 600, 648
See application file for complete search history.

(56) References Cited

U.S. PATENT DOCUMENTS

| 5,729,464 | A | 3/1998 | Dimitri |
| 6,621,693 | B1 * | 9/2003 | Potter et al. .............. 361/679.33 |

(Continued)

FOREIGN PATENT DOCUMENTS

| EP | 1519375 A2 | 3/2005 |
| JP | 917164 A | 1/1997 |

(Continued)

OTHER PUBLICATIONS

Communication dated Jul. 15, 2014, issued by the Japanese Patent Office, in counterpart Application No. 2011074609.

(Continued)

*Primary Examiner* — Allen T Cao
(74) *Attorney, Agent, or Firm* — Sughrue Mion, PLLC

(57) ABSTRACT

An exemplary object is to provide a library apparatus, a magazine insertion detection method, and a program that are capable of detecting whether or not a magazine is inserted for all the magazine insertion positions without using sensors for detecting insertion of magazines. A library apparatus includes: a mark reading unit which is provided in an accessor unit which transfers a plurality of media that can be read and written by a computer, and reads a predetermined mark for all insertion positions of a plurality of magazines which can be inserted into the library apparatus and can accommodate the media, the mark being stuck to each of cells accommodating the media; and a control unit which, if the mark can be read, determines that a magazine is inserted at an insertion position which includes a read position for which a reading result that the mark can be read has been obtained, and, if the mark cannot be read, determines that no magazine is inserted at an insertion position which includes a read position for which a reading result that the mark cannot be read has been obtained.

18 Claims, 5 Drawing Sheets

(56) References Cited

U.S. PATENT DOCUMENTS

| | | | |
|---|---|---|---|
| 7,697,228 B2* | 4/2010 | Bai et al. | 360/69 |
| 2005/0230470 A1 | 10/2005 | Hoshino | |
| 2009/0119465 A1* | 5/2009 | Kishi et al. | 711/154 |
| 2009/0234500 A1 | 9/2009 | Tanaka | |
| 2010/0172045 A1* | 7/2010 | Goodman et al. | 360/31 |
| 2013/0329540 A1* | 12/2013 | Yoshida | 369/99 |

FOREIGN PATENT DOCUMENTS

| | | |
|---|---|---|
| JP | 10-275399 A | 10/1998 |
| JP | 200439237 A | 2/2004 |
| JP | 2008-287828 A | 11/2008 |
| JP | 2009-223943 A | 10/2009 |
| WO | 9926245 A1 | 5/1999 |

OTHER PUBLICATIONS

European Search Report: Application No. 12765078.6 1803/2693436 PCT/JP2012051163; Oct. 29, 2014.

* cited by examiner

LIBRARY APPARATUS, MAGAZINE INSERTION DETECTION METHOD, AND PROGRAM

CROSS REFERENCE TO RELATED APPLICATIONS

This application is a National Stage of International Application No. PCT/JP2012/051163 filed Jan. 20, 2012, claiming priority based on Japanese Patent Application No. 2011-074609, filed Mar. 30, 2011, the contents of all of which are incorporated herein by reference in their entirety.

TECHNICAL FIELD

The present invention relates to a library apparatus, a magazine insertion detection method, and a program that detect whether or not a magazine that is capable of accommodating a plurality of media that can be read and written by a computer has been inserted.

BACKGROUND ART

It is known that library apparatuses in which a magazine that is capable of accommodating a plurality of media that can be read and written by a computer (e.g., cartridges that pack magnetic tapes) is inserted and the media are read and written by a drive perform inventory as a management process of information on the presence or absence, addition, unloading, transfer, and so on of the media (see, for example, Patent Document 1).

PRIOR ART DOCUMENT

Patent Document

Patent Document 1: Japanese Unexamined Patent Application, First Publication No. 2008-287828

SUMMARY OF INVENTION

Problems to be solved by the Invention

When the inventory is performed, in the first place, it is necessary to detect whether or not magazines are inserted. Sensors that are provided so as to correspond to insertion positions of the magazines are used for the detection. That is, if there is a response from a sensor, the fact that a magazine is inserted at an insertion position corresponding to the sensor is detected. In contrast, if there is no response from a sensor, the fact that no magazine is inserted at an insertion position corresponding to the sensor. Then, the inventory is performed on only magazines for which the insertion thereof has been detected, thereby making it possible to reduce the time required for the inventory.

In general, a plurality of magazines are inserted into a single library apparatus. Accordingly, it is necessary to provide sensors so as to correspond to insertion positions of the magazines. This is because if there is an insertion position where no sensor is provided, inventory is performed even when no magazine is inserted at the insertion position, and thus time is wasted.

However, if sensors are provided so as to correspond to all of a plurality of insertion positions, not only costs are increased but also space for installing the sensors is increased, so that there is a possibility that the number of magazines that can be inserted is reduced (if the number of magazines that can be inserted is maintained, the size of a library apparatus itself is increased).

The present invention has been made in view of the above circumstances, and an exemplary object thereof is to provide a library apparatus, a magazine insertion detection method, and a program that are capable of detecting whether or not a magazine is inserted for all the magazine insertion positions without using sensors for detecting insertion of magazines.

Means for Solving the Problems

In order to achieve the above exemplary object, a library apparatus of the present invention includes: a mark reading unit which is provided in an accessor unit which transfers a plurality of media that can be read and written by a computer, and reads a predetermined mark for all insertion positions of a plurality of magazines which can be inserted into the library apparatus and can accommodate the media, the mark being stuck to each of cells accommodating the media; and a control unit which, if the mark can be read, determines that a magazine is inserted at an insertion position which includes a read position for which a reading result that the mark can be read has been obtained, and, if the mark cannot be read, determines that no magazine is inserted at an insertion position which includes a read position for which a reading result that the mark cannot be read has been obtained.

A magazine insertion detection method of the present invention includes:

reading, by a mark reading unit which is provided in an accessor unit which transfers a plurality of media that can be read and written by a computer, a predetermined mark for all insertion positions of a plurality of magazines which can be inserted into an apparatus and can accommodate the media, the mark being stuck to each of cells accommodating the media; determining, if the mark can be read, that a magazine is inserted at an insertion position which includes a read position for which a reading result that the mark can be read has been obtained; and determining, if the mark cannot be read, that no magazine is inserted at an insertion position which includes a read position for which a reading result that the mark cannot be read has been obtained.

A program of the present invention causes a computer to execute: a reading process of reading, by a mark reading unit which is provided in an accessor unit which transfers a plurality of media that can be read and written by the computer, a predetermined mark for all insertion positions of a plurality of magazines which can be inserted into an apparatus and can accommodate the media, the mark being stuck to each of cells accommodating the media; and a determination process of determining, if the mark can be read, that a magazine is inserted at an insertion position which includes a read position for which a reading result that the mark can be read has been obtained, and determining, if the mark cannot be read, that no magazine is inserted at an insertion position which includes a read position for which a reading result that the mark cannot be read has been obtained.

Exemplary Advantageous Effects of the Invention

The present invention can detect whether or not a magazine is inserted for all the magazine insertion positions without using sensors for detecting insertion of magazines.

MODES FOR CARRYING OUT THE INVENTION

Hereinafter, modes for carrying out (exemplary embodiments of) the present invention will be described in detail with reference to the attached drawings.

Figure 1:
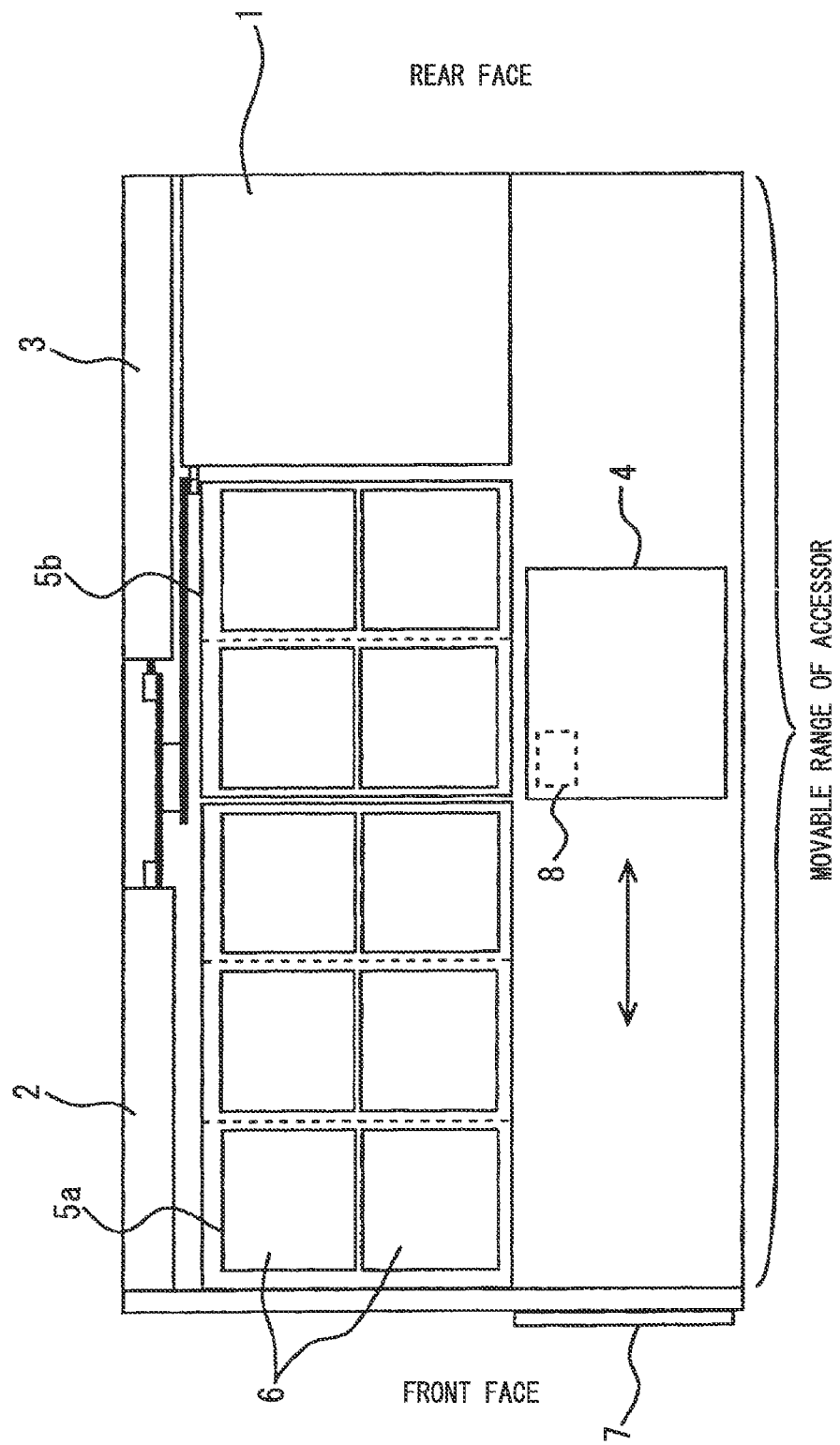
FIG. 1 is a top view illustrating an example of a configuration of a library apparatus in accordance with an exemplary embodiment of the present invention.
Figure 2:
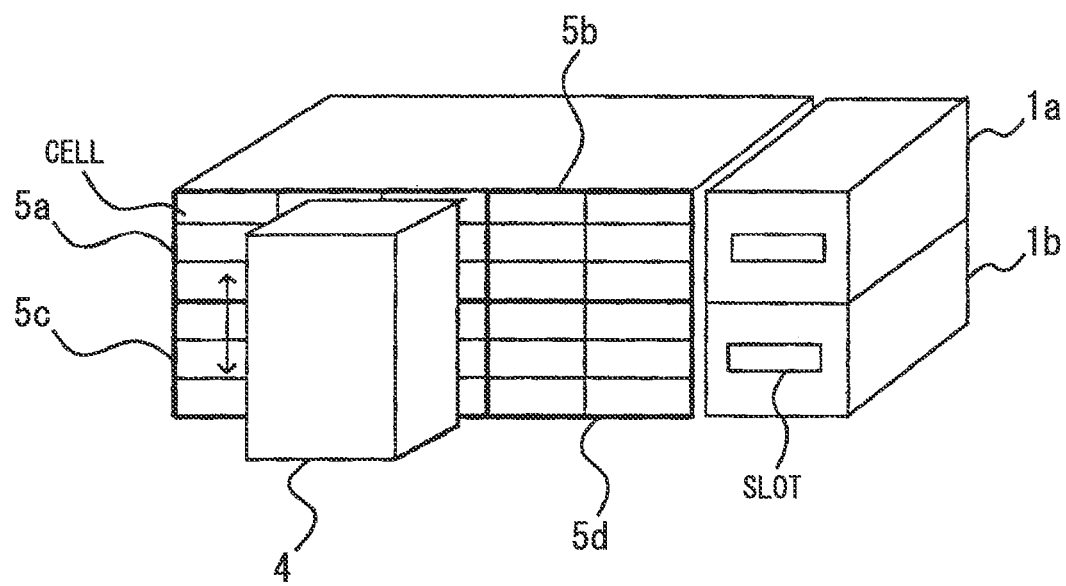
FIG. 2 is a perspective view illustrating an example of a configuration of the library apparatus in accordance with the exemplary embodiment of the present invention.

First, a configuration of a library apparatus in accordance with an exemplary embodiment of the present invention will be described using FIG. 1 and FIG. 2. FIG. 1 is a diagram (a top view) of the library apparatus in accordance with the exemplary embodiment of the present invention viewed from above the library apparatus. FIG. 2 is a side view (a perspective view) of the library apparatus in accordance with the exemplary embodiment of the present invention.

The library apparatus of the present exemplary embodiment includes a drive device 1, a control device 2, a power supply device 3, an accessor mechanism 4, and a front panel 7, and magazines 5a, 5b, 5c, and 5d are detachable therefrom. It is to be noted that in the description below, one of these magazines may be referred to as a magazine 5.

The magazine 5a, 5b, 5c, and 5d are inserted through insertion slots (not shown in FIG. 1) provided on a front face of the library apparatus. The example of FIG. 1 illustrates the case in which the magazine 5b is inserted and then the magazine 5a is inserted. In this way, the magazine 5b and the magazine 5a are inserted in series along an insertion direction (the same is applied to the magazines 5c and 5d). The magazine 5a, 5b, 5c, and 5d each include a plurality of cells (portions partitioned by dotted lines), and each cell accommodates two media 6. That is, a deep cell scheme is employed. Therefore, the magazines 5a and 5c each can accommodate a maximum of eighteen media 6 (3 rows in width×3 columns in length×2). In addition, the magazines 5b and 5d each can accommodate a maximum of twelve media 6 (2 rows in width×3 rows in length×2).

The media 6 are recording media that can be read and written by a computer, and an example thereof is cartridges that pack magnetic tapes. The media 6 are detachable from the magazines 5.

The accessor mechanism 4 (an accessor unit) is movable along the direction from the front to the rear and the direction from the rear to the front (movement along the depth direction of the library apparatus; the direction along a two-directional arrow in FIG. 1). As shown in FIG. 1, the movable range of the accessor mechanism 4 along the depth direction of the library apparatus is between a front face and a rear face. The accessor mechanism 4 is also movable along the direction from the top to the bottom of the library apparatus and the direction from the bottom to the top (movement along the upright direction of the library apparatus; the direction along a two-directional arrow in FIG. 2). The movable range of the accessor mechanism 4 in the upright direction of the library apparatus is between the top face and the bottom face of the library apparatus.

For example, upon receipt of a read instruction or a write instruction of a given medium 6, the accessor mechanism 4 transfers the medium 6. That is, in accordance with the instruction from the control device 2, the accessor mechanism 4 pulls the designated medium 6 out of a magazine 5, transfers the medium 6 to the drive device 1, and puts the medium 6 into a slot thereof. Upon completion of reading or writing of the medium 6, the accessor mechanism 4 pulls the medium 6 out of the slot of the drive device 1, transfers the medium 6 to the magazine 5 that accommodated the medium 6, and puts the medium 6 into a cell that accommodated the medium 6. It is to be noted that with the deep cell scheme, when the designated medium 6 is accommodated at a farther position in the cell, it is necessary to perform an evacuation operation which temporarily evacuates a medium that is accommodated at a nearer position in the cell to an empty cell, and thus the accessor mechanism 4 also performs the evacuation operation.

Figure 3:
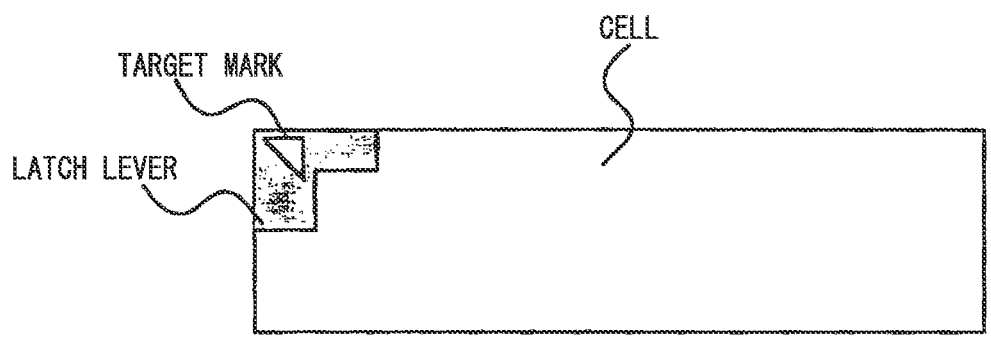
FIG. 3 is a front view illustrating an example of a target mark in the library apparatus in accordance with the exemplary embodiment of the present invention.

The accessor mechanism 4 is provided with a camera 8. The camera 8 is used to read a bar code (an example of a recording code) stuck on a medium 6 accommodated in a cell when inventory is performed. Moreover, the camera 8 is used to read a target mark (also simply called "a mark") stuck to a latch lever (a member which holds a medium 6 inserted into a cell) that is provided for each cell, when the accessor mechanism 4 is located. In this context, the camera 8 can be called "a mark reading unit". It is to be noted that FIG. 3 is a front view of an insertion slot for media 6 in one cell. As shown in FIG. 3, a latch lever is provided at an upper left corner of a medium insertion slot of a cell, and a triangular target mark is stuck on the latch lever. The camera 8 photographs the target mark shown in FIG. 3 and reads the target mark. The technology of the above camera 8 and the target mark is employed in well-known library apparatuses.

The drive device 1 reads data from a medium 6 put into a slot and writes data in the medium 6. In the present exemplary embodiment, a plurality of drive devices 1a and 1b are arranged so that they are stacked in the vertical direction as shown in FIG. 2.

The control device 2 (a control unit) controls the operation of the library apparatus. For example, upon receipt of a read instruction of a medium 6 from a user, the control device 2 controls the accessor mechanism 4 to transfer the medium 6, and controls the drive device 1 to read the transferred medium 6. Moreover, the control device 2 also performs control to realize the operation of the present exemplary embodiment shown in FIG. 5 and FIG. 6, which will be described below.

The power supply device 3 supplies electricity to operate the library apparatus.

The front panel 7 accepts various operations from the user and displays various pieces of information for the user.

It is to be noted that, although not shown in the drawings, the library apparatus is also provided with an interface for connection with, for example, another apparatus (e.g., a host computer).

Figure 4:
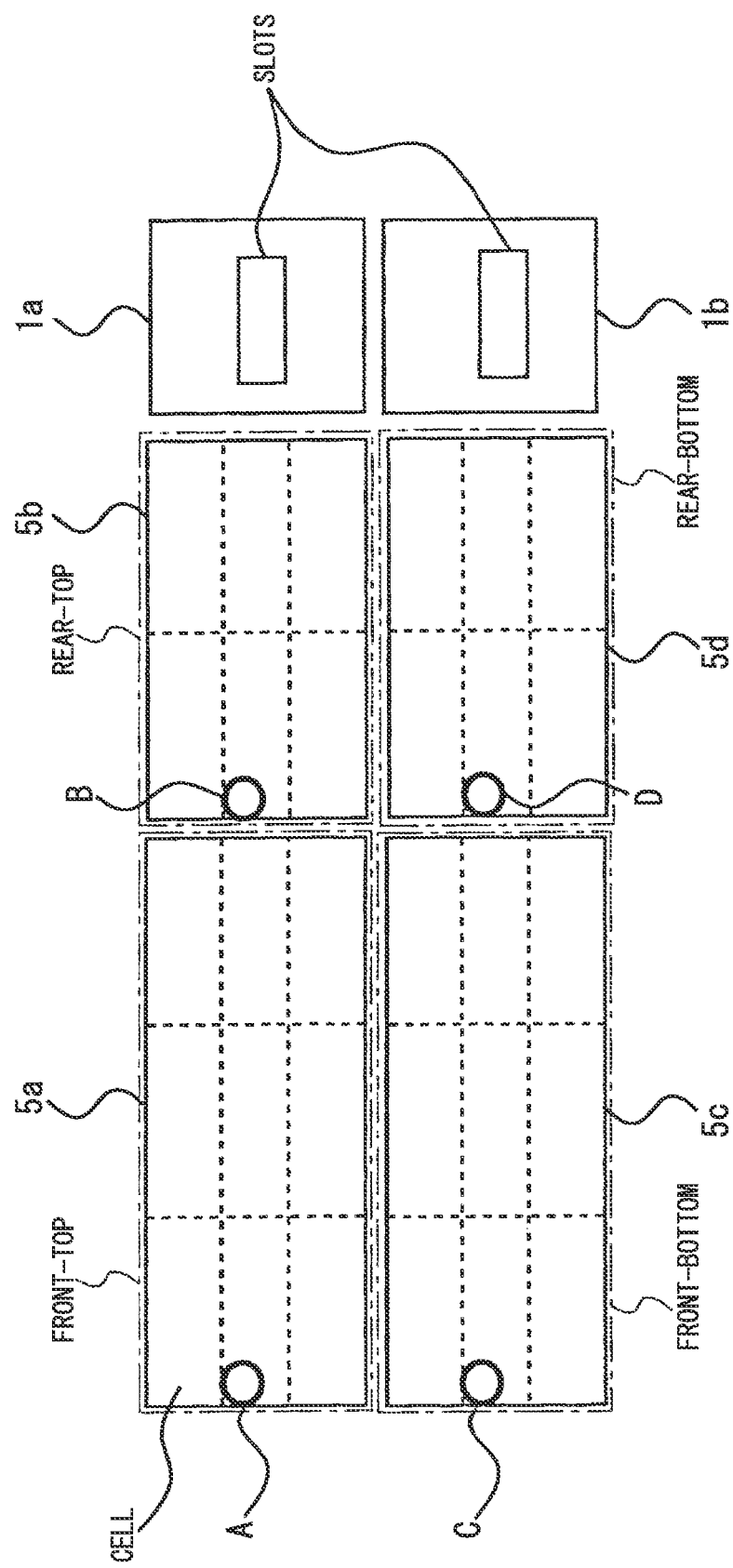
FIG. 4 is a diagram describing an example of reading of a target mark in the library apparatus in accordance with the exemplary embodiment of the present invention.
Figure 5:
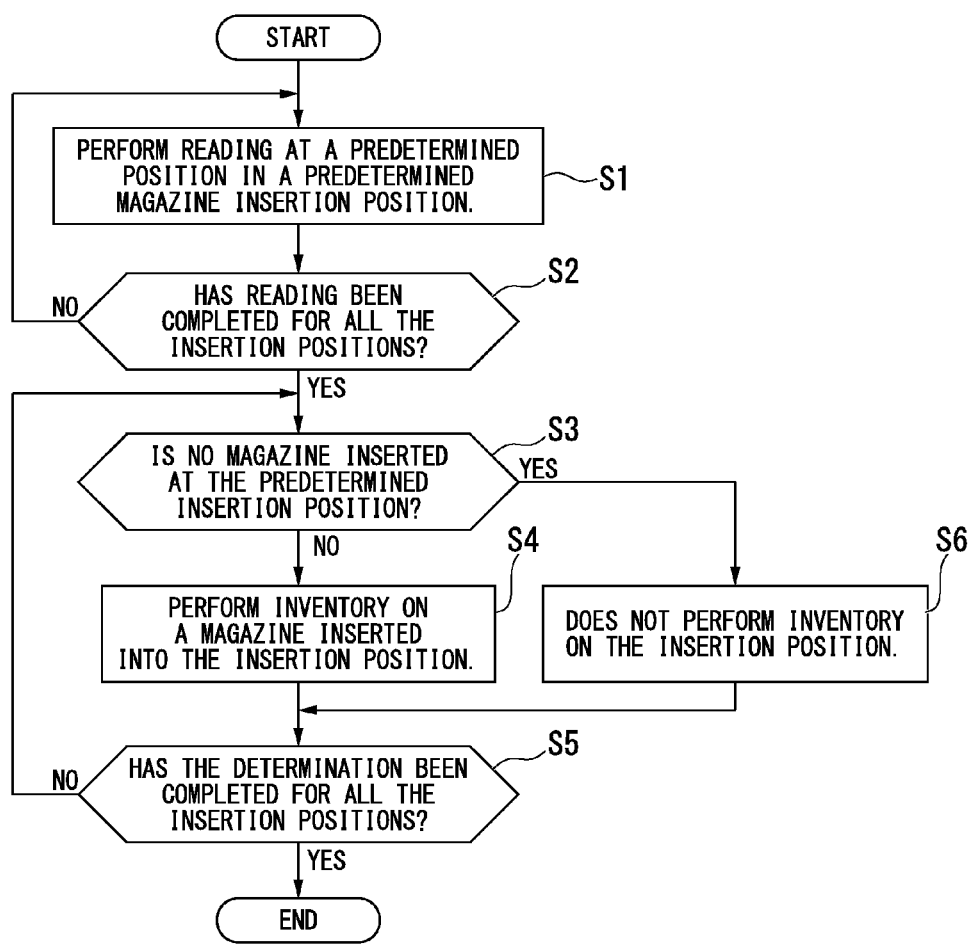
FIG. 5 is a flowchart illustrating a first example of an operation of the library apparatus in accordance with the exemplary embodiment of the present invention.
Figure 6:
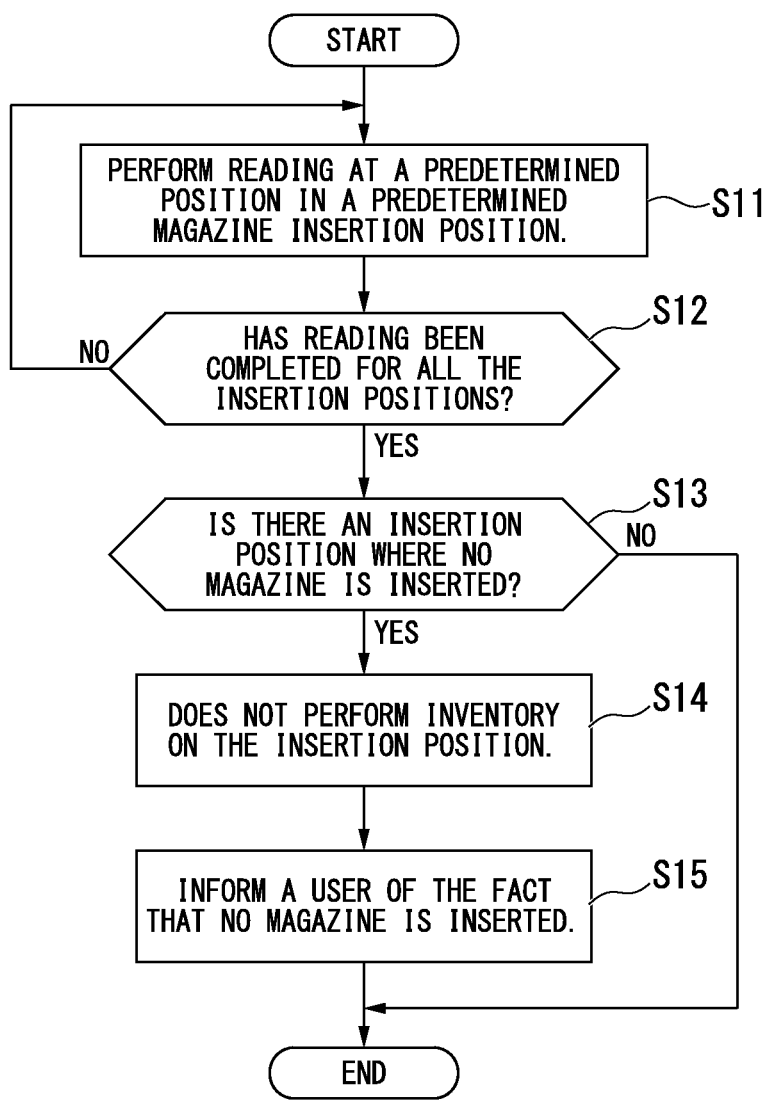
FIG. 6 is a flowchart illustrating a second example of an operation of the library apparatus in accordance with the exemplary embodiment of the present invention.

Next, an example of an operation of the library apparatus in accordance with the present exemplary embodiment, which is configured as described above, will be described using FIG. 4 to FIG. 6. FIG. 4 is diagram directly viewing a side of the library apparatus (a side face on which the accessor mechanism 4 is present). FIG. 5 is a flow illustrating a first example of the operation of the library apparatus in accordance with the present exemplary embodiment. FIG. 6 is a flow illustrating a second example of the operation of the library apparatus in accordance with the present exemplary embodiment. Hereinafter, the first and the second examples of the operation will be described in order.

FIRST EXAMPLE OF OPERATION

For example, when a user performs an operation for turning on power of the library apparatus so that the power is supplied from the power supply device 3, the control device 2 controls the accessor mechanism 4 and the camera 8 to read a predetermined position at a given magazine insertion position (step S1). In the example of FIG. 4, a read position A in a "front-top" magazine insertion position where the magazine 5a is inserted is read. If the magazine 5a is inserted, a target mark stuck to a latch lever of a left-middle cell is present at the read position A. The control device 2 temporarily holds the reading result of the read position A (to be used in the determination in step S3, which will be described below). It is to be noted that although target marks and latch levers are provided at upper left corners of all the cells, they are omitted in FIG. 4.

Next, the control device 2 determines whether or not reading for all the magazine insertion positions has been completed (step S2). In the example of FIG. 4, all the magazine insertion positions mean four positions including: the "front-top" position where the magazine 5a is to be inserted; a "rear-top" position where the magazine 5b is to be inserted; a "front-bottom" position where the magazine 5c is to be inserted; and a "rear-bottom" position where the magazine 5d is to be inserted. Accordingly, the control device 2 determines whether or not reading for all the read positions A, B, C, and D in the four magazine insertion positions has been completed.

If the result of determination in step S2 indicates that the reading of the read positions in all the magazine insertion positions has not been completed (step S2/NO), the control device 2 performs reading at a read position in the next magazine insertion position in accordance with a predetermined reading order (step S1). For example, when the reading order is determined as "the front-top position→the front-bottom position→the rear-top position→the rear-bottom position", after reading at the read position A in the front-top position and temporary storage of the result of the reading have been completed, reading at the read position C in the front-bottom position and temporary storage of the result thereof are performed.

If the result of the determination in step S2 indicates that the reading of the read positions in all the magazine insertion positions and temporary storage of the results thereof have been completed (step S2/YES), the control device 2 determines whether no magazine is inserted at a predetermined magazine insertion position based on the temporarily stored reading results (step S3). With respect to a reading result indicating that a target mark has been read, the control device 2 determines that a magazine is inserted at a magazine insertion position which includes a read position for which the reading result has been obtained (step S3/NO). In contrast, with respect to a reading result indicating that a target mark has not been read, the control device 2 determines that no magazine is inserted at a magazine insertion position which includes a read position for which the reading result has been obtained (step S3/YES). For example, if the reading result of the read position A indicates that a target mark has been read, the control device 2 determines that a magazine is inserted at the front-top position. In contrast, if the reading result of the read position A indicates that a target mark has not been read, the control device 2 determines that no magazine is inserted at the front-top position.

If a determination has been made that a magazine is inserted at a magazine insertion position as a result of the determination in step S3 (step S3/NO), the control device 2 performs control so that inventory is executed on the magazine inserted at the magazine insertion position (step S4). Thereafter, the processing proceeds to step S5.

If a determination has been made that no magazine is inserted at a magazine insertion position as a result of the determination in step S3 (step S3/YES), the control device 2 performs control so that inventory is not executed on the magazine at the magazine insertion position (step S6). Thereafter, the processing proceeds to step S5.

Next, the control device 2 determines whether or not the determination in step S3 (the determination as to whether no magazine is inserted) for all the magazine insertion positions has been completed (step S5).

If the result of the determination in step S5 indicates that the determination in step S3 for all the magazine insertion positions has not been completed (step S5/NO), the control device 2 performs the determination in step S3 on the next magazine insertion position in accordance with a predetermined determination order (step S3). For example, when the determination order is defined as "the front-top position→the front-bottom position→the rear-top position→the rear-bottom position", after the determination in step S3 for the front-top position has been completed, the determination in step S3 is made for the front-bottom position.

If the result of the determination in step S5 indicates that the determination in step S3 for all the magazine insertion positions has been completed (step S5/YES), the control device 2 ends the series of operations.

SECOND EXAMPLE OF OPERATION

Since steps S11 and S12 of FIG. 6 are the same as steps S1 and S2 in FIG. 5 described in the above first example of operation, the description thereof is omitted here.

When the result of the determination in step S12 indicates that the reading at the read positions and the temporary storage of the results of the reading for all the magazine insertion positions have been completed (step S12/YES), the control device 2 determines whether or not there is a magazine insertion position where no magazine is inserted based on all the temporarily stored reading results (step S13). Here, similar to step S3 in the above first example of operation, if a reading result indicates that a target mark has been read, the control device 2 determines that a magazine is inserted at a magazine insertion position which includes a read position for which the reading result has been obtained, and if a reading result indicates that a target mark has not been read, the control device 2 determines that no magazine is inserted at a magazine insertion position which includes a read position for which the reading result has been obtained. The determination is successively performed for all the reading results (unlike the above first example of operation, the processing does not proceeds to the next step even when one determination has been completed). For example, after a determination as to whether or not a magazine is inserted at the front-top position has been completed based on whether or not the reading result of the read position A indicates that a target mark has been read, the control device 2 then successively performs similar determinations on the reading result of the read position C, the reading result of the read position B, and the reading result of the read position D. By doing so, it is possible to determine whether or not a magazine is inserted for all the magazine insertion positions.

If the result of the determination in step S13 indicates that there is no magazine insertion position where no magazine is inserted, that is, if magazines are inserted at all the magazine insertion positions (step S13/NO), the control device 2 successively executes inventory, and then ends the series of operations.

If the result of the determination in step S13 indicates that there is at least one magazine insertion position where no magazine is inserted (step S13/YES), the control device 2 performs control so that inventory is not executed on a magazine insertion position where no magazine is inserted (step S14).

Next, the control device 2 performs control to inform a user of the fact that no magazine is inserted (step S15). For example, the control device 2 performs control so that the fact that no magazine is inserted is displayed on a screen of a display unit of the front panel 7; alternatively, the control device 2 performs control so that the fact that no magazine is inserted is displayed on a screen of a host computer connected to the library apparatus. It is to be noted that step S15 may be performed between steps S6 and S5 of FIG. 5 in the above first example of operation. Moreover, in step S15, instead of performing notification of the fact that no magazine is inserted, notification of a magazine insertion position where no magazine is inserted may be performed.

As described above, in the present exemplary embodiment, it is possible to detect whether or not a magazine is inserted for all the magazine insertion positions without using sensors for detecting insertion of magazines. Accordingly, it is possible to reduce costs and space compared to configurations using the sensors. Moreover, since the presence or absence of insertion of a magazine can be detected for all the magazine insertion positions, it is possible to avoid unnecessary inventory with respect to an insertion position where no magazine is inserted and to increase efficiency in terms of the time for executing inventory.

Moreover, in the present exemplary embodiment, when the fact that no magazine is inserted has been detected, inventory is not performed for that insertion position, so that it is possible to prevent unnecessary inventory from being executed.

Furthermore, in the present exemplary embodiment, when the fact that no magazine is inserted has been detected, inventory is not performed for that insertion position and a user is informed of the fact that no magazine is inserted, so that it is possible to prevent unnecessary inventory from being executed and it is possible for the user to recognize that no magazine is inserted.

Additionally, the present exemplary embodiment uses a camera which is used for reading a recording code stuck to a medium when inventory is performed as well as a target mark which is stuck to a latch lever that is provided in the vicinity of an insertion slot for media in a cell and is read when an accessor mechanism is located. By doing so, it is possible to detect whether or not a magazine is inserted for all the magazine insertion positions using the existing hardware configuration without installing additional hardware. Therefore, costs and space for additional components and so on are not required, and thus it is easy to incorporate the present exemplary embodiment into existing library apparatuses.

Although exemplary embodiments of the present invention have been described above, the present invention is not limited by the above description, and various modifications are possible as long as they do not depart from the gist of the present invention.

For example, the operation of the above-described exemplary embodiments can be executed by hardware, software, or a complex configuration of hardware and software.

When processes using software are executed, a program recording a processing sequence may be installed on a memory in a computer embedded in dedicated hardware and the program may be executed. Alternatively, a program may be installed on a general-purpose computer, which can execute various processes, and the program may be executed.

For example, a program can be recorded in advance in a hard disk or a ROM (read only memory) that serves as a recording medium. Alternatively, a program can be temporarily or permanently stored (recorded) in a removable recording medium such as a CD-ROM (compact disc read only memory), a MO (magneto optical) disc, a DVD (digital versatile disc), a USB (universal serial bus) memory, a magnetic disk, and a semiconductor memory. These removable media can be provided as so-called package software.

It is to be noted that a program may be transferred by radio from a download site to a computer, instead of installing a program on a computer from a removable recording medium as described above. Alternatively, a program may be transferred to a computer via a wired network such as a LAN (local area network) and the Internet. The computer can receive the transferred program and install the program on a recording medium such as an embedded hard disk.

Moreover, instead of execution in chronological order in accordance with the processing operations described in the above exemplary embodiments, a configuration of parallel execution or individual execution is possible depending on the processing performance of an apparatus that executes the processing or needs.

This application is based upon and claims the benefit of priority from Japanese patent application No. 2011-074609, filed on Mar. 30, 2011, the disclosure of which is incorporated herein in its entirety by reference.

INDUSTRIAL APPLICABILITY

The present invention can be used, for example, in library apparatuses in which a magazine that can accommodate a plurality of media that are read and written by a computer is inserted and the media are read and written by a drive. The present invention can detect whether or not a magazine is inserted for all the magazine insertion positions without using sensors for detecting insertion of magazines.

Description Of Reference Symbols 1 drive device
2 control device
3 power supply device
4 accessor mechanism
5a, 5b, 5c, 5d magazine
6 medium
7 front panel
8 camera

The invention claimed is:

1. A library apparatus comprising:
a mark reading unit which is provided in an accessor unit which transfers a plurality of media that are read and written by a computer, and reads a predetermined mark for all insertion positions of a plurality of magazines which are inserted into the library apparatus and accommodate the media, the mark being stuck to each of cells accommodating the media; and
a control unit which, if reading the mark has succeeded, determines that a magazine is inserted at an insertion position which includes a read position for which a reading result, that the reading of the mark has succeeded, has been obtained, and, if the reading of the mark has failed, determines that no magazine is inserted at an insertion position which includes a read position for which a reading result, that the reading of the mark has failed, has been obtained, wherein when a determination has been made that no magazine is inserted at a predetermined insertion position, the control unit performs notification of the fact that no magazine is inserted.

2. The library apparatus according to claim 1, wherein when a determination has been made that no magazine is inserted at a predetermined insertion position, the control unit does not perform inventory on the magazine at the insertion position.

3. The library apparatus according to claim 1, wherein the mark reading unit reads a mark stuck to a cell at a predetermined position among a plurality of marks stuck to the cells, for each of the magazines.

4. The library apparatus according to claim 1, wherein the mark reading unit is a camera which is used for reading a recording code stuck to a medium when inventory is performed.

5. The library apparatus according to claim 1, wherein the mark is a target mark which is stuck to a latch lever that is provided around an insertion slot for a medium in a cell and is read when the accessor unit is located.

6. The library apparatus according to claim 2, wherein the mark reading unit reads a mark stuck to a cell at a predetermined position among a plurality of marks stuck to the cells, for each of the magazines.

7. The library apparatus according to claim 2, wherein the mark reading unit is a camera which is used for reading a recording code stuck to a medium when inventory is performed.

8. The library apparatus according to claim 3, wherein the mark reading unit is a camera which is used for reading a recording code stuck to a medium when inventory is performed.

9. The library apparatus according to claim 6, wherein the mark reading unit is a camera which is used for reading a recording code stuck to a medium when inventory is performed.

10. The library apparatus according to claim 2, wherein the mark is a target mark which is stuck to a latch lever that is provided around an insertion slot for a medium in a cell and is read when the accessor unit is located.

11. The library apparatus according to claim 6, wherein the mark is a target mark which is stuck to a latch lever that is provided around an insertion slot for a medium in a cell and is read when the accessor unit is located.

12. The library apparatus according to claim 4, wherein the mark is a target mark which is stuck to a latch lever that is provided around an insertion slot for a medium in a cell and is read when the accessor unit is located.

13. The library apparatus according to claim 6, wherein the mark is a target mark which is stuck to a latch lever that is provided around an insertion slot for a medium in a cell and is read when the accessor unit is located.

14. The library apparatus according to claim 7, wherein the mark is a target mark which is stuck to a latch lever that is provided around an insertion slot for a medium in a cell and is read when the accessor unit is located.

15. The library apparatus according to claim 8, wherein the mark is a target mark which is stuck to a latch lever that is provided around an insertion slot for a medium in a cell and is read when the accessor unit is located.

16. The library apparatus according to claim 9, wherein the mark is a target mark which is stuck to a latch lever that is provided around an insertion slot for a medium in a cell and is read when the accessor unit is located.

17. A magazine insertion detection method comprising:
reading, by a mark reading unit which is provided in an accessor unit which transfers a plurality of media that are read and written by a computer, a predetermined mark for all insertion positions of a plurality of magazines which are inserted into an apparatus and accommodate the media, the mark being stuck to each of cells accommodating the media;

determining, if reading of the mark has succeeded, that a magazine is inserted at an insertion position which includes a read position for which a reading result, that the reading of the mark has succeeded, has been obtained;

determining, if the reading of the mark has failed, that no magazine is inserted at an insertion position which includes a read position for which a reading result, that the reading of the mark has failed, has been obtained; and when a determination has been made that no magazine is inserted at a predetermined insertion position, performing notification of the fact that no magazine is inserted.

18. A non-transitory computer-readable recording medium storing a program which causes a computer to execute:
a reading process of reading, by a mark reading unit which is provided in an accessor unit which transfers a plurality of media that are read and written by the computer, a predetermined mark for all insertion positions of a plurality of magazines which are inserted into an apparatus and accommodate the media, the mark being stuck to each of cells accommodating the media; and a determination process of determining, if reading the mark has succeeded, that a magazine is inserted at an insertion position which includes a read position for which a reading result, that the reading of the mark has succeeded, has been obtained, and determining, if the reading of the mark has failed, that no magazine is inserted at an insertion position which includes a read position for which a reading result, that the reading of the mark has failed, has been obtained;

wherein when a determination has been made that no magazine is inserted at a predetermined insertion position, the determination process performs notification of the fact that no magazine is inserted.

* * * * *